United States Patent
Peng et al.

(10) Patent No.: US 9,699,661 B2
(45) Date of Patent: Jul. 4, 2017

(54) METHOD AND APPARATUS FOR PCI CLASSIFIED SELF-CONFIGURATION

(71) Applicant: BEIJING UNIVERSITY OF POSTS & TELECOMMUNICATIONS, Beijing (CN)

(72) Inventors: Mugen Peng, Beijing (CN); Yao Wei, Beijing (CN); Shijun Min, Beijing (CN); Wenbo Wang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 166 days.

(21) Appl. No.: 14/686,818

(22) Filed: Apr. 15, 2015

(65) Prior Publication Data

US 2015/0223073 A1 Aug. 6, 2015

Related U.S. Application Data

(63) Continuation of application No. PCT/CN2013/075587, filed on May 14, 2013.

(30) Foreign Application Priority Data

Oct. 26, 2012 (CN) .......................... 2012 1 0418321

(51) Int. Cl.
*H04W 16/12* (2009.01)
*H04W 8/26* (2009.01)
(Continued)

(52) U.S. Cl.
CPC ............. *H04W 16/12* (2013.01); *H04W 4/08* (2013.01); *H04W 8/26* (2013.01); *H04W 24/02* (2013.01); *H04W 48/16* (2013.01); *H04W 88/08* (2013.01)

(58) Field of Classification Search
CPC ......... H04W 16/12; H04W 4/08; H04W 8/26; H04W 24/02; H04W 48/16; H04W 88/08
See application file for complete search history.

(56) References Cited

U.S. PATENT DOCUMENTS 8,189,541 B2   5/2012   Swarts et al.
8,804,561 B2 * 8/2014   Kazmi .................... H04W 8/26
                                                              370/242

(Continued)

FOREIGN PATENT DOCUMENTS

CN   101772036 A   7/2010
CN   101990210 A   3/2011

(Continued)

OTHER PUBLICATIONS

Chinese Office Action dated Aug. 10, 2016 for Chinese application No. 201210418321.4.

(Continued)

*Primary Examiner* — Mehmood B Khan
(74) *Attorney, Agent, or Firm* — Ohlandt, Greeley, Ruggiero & Perle, LLP

(57) ABSTRACT

Provided is a method for PCI classified self-configuration, including: according to the characteristic of PCI code, dividing all PCIs into $\Delta_L$ large groups in accordance with a step length $\Delta_L$, and then dividing resources of each of the large groups into $\Delta_S$ small groups in accordance with a step length $\Delta_S$, generating a PCI resource list, and identifying each PCI by three sections of address codes representing a large group number, a small group number and an intra-group number of the PCI, respectively; mapping the PCI resources one by one to new base stations in accordance with a classification that each new station and heterogeneous nodes covered thereby correspond to a small group of PCI resources; allocating a first PCI in each small group of PCI resources to a new base station, and randomly allocating the (Continued)

remaining PCIs in the small group of PCI resources to the covered heterogeneous nodes.

8 Claims, 6 Drawing Sheets

(51) Int. Cl.
  *H04W 4/08* (2009.01)
  *H04W 48/16* (2009.01)
  *H04W 24/02* (2009.01)
  *H04W 88/08* (2009.01)

(56) References Cited

U.S. PATENT DOCUMENTS

| | | | | |
|---|---|---|---|---|
| 9,456,415 B2 * | 9/2016 | Peng | ............ | H04W 52/04 |
| 2012/0231805 A1 * | 9/2012 | Wang | ............ | H04J 11/0073 |
| | | | | 455/452.1 |
| 2013/0083744 A1 * | 4/2013 | Peng | ............ | H04W 52/04 |
| | | | | 370/329 |
| 2013/0265939 A1 * | 10/2013 | Pedersen | ............ | H04W 28/16 |
| | | | | 370/328 |
| 2014/0087735 A1 * | 3/2014 | Vikberg | ............ | H04W 36/0011 |
| | | | | 455/436 |

FOREIGN PATENT DOCUMENTS

| | | |
|---|---|---|
| CN | 102421101 A | 4/2012 |
| CN | 102651876 A | 8/2012 |
| EP | 2 503 815 | 9/2012 |

OTHER PUBLICATIONS

Chinese Search Report dated Aug. 10, 2016 for Chinese application No. 201210418321.4.
Lim et al; "Management of Neighbor Cell Lists and Physical Cell Identifiers in Self-Organizing Heterogeneous Networks"; Journal of Communications and Networks, vol. 13, No. 4; Aug. 2011; pp. 1-10.
Email Discussion Rapporteur (Motorola); "LTE-UMTS: Inbound Mobility to CSG Cell From LTD Cell"; Jun. 29-Jul. 3, 2009; pp. 1-29.
International Search Report dated Jul. 4, 2013 from PCT/CN2013/075587, 5 pages.
Written Opinion dated Jul. 4, 2013 from PCT/CN2013/075587, 4 pages.

* cited by examiner according to characteristic of PCI code, dividing all PCIs into $\Delta_L$ large groups in accordance with a step length $\Delta_L$, and then dividing resources of each of the large groups into $\Delta_S$ small groups in accordance with a step length $\Delta_S$, generating a PCI resources list, and identifying each PCI in the PCI resources list by three sections of address codes, wherein the three sections of address codes represent a large group number, a small group number and an in-group number of PCI, respectively — 101 mapping the PCI resources one by one to new base stations in accordance with a classification such that each new station and heterogeneous nodes covered thereby correspond to a small group of PCI resources; and $\Delta_S$ adjacent new base stations form a base station cluster which corresponds to a large group of PCI resources — 102 allocating a first PCI in each small group of PCI resources to a new base station, and randomly allocating the remaining PCIs in the small group of PCI resources to the heterogeneous nodes which are covered by the new base station — 103

FIG. 1

|  | large group 1 | large group 2 | large group 3 | large group 4 | large group 5 | large group 6 | large group 7 | large group 8 |
|---|---|---|---|---|---|---|---|---|
| small group 1 | 0 | 1 | 2 | 3 | 4 | 5 | 6 | 7 |
| small group 2 | 8 | 9 | 10 | 11 | 12 | 13 | 14 | 15 |
| small group 3 | 16 | 17 | 18 | 19 | 20 | 21 | 22 | 23 |
| small group 1 | 24 | 25 | 26 | 27 | 28 | 29 | 30 | 31 |
| small group 2 | 32 | 33 | 34 | 35 | 36 | 37 | 38 | 39 |
| small group 3 | 40 | 41 | 42 | 43 | 44 | 45 | 46 | 47 |
| small group 1 | 48 | 49 | 50 | 51 | 52 | 53 | 54 | 55 |
| small group 2 | 56 | 57 | 58 | 59 | 60 | 61 | 62 | 63 |
| small group 3 | 64 | 65 | 66 | 67 | 68 | 69 | 70 | 71 |
| small group 1 | 72 | 73 | 74 | 75 | 76 | 77 | 78 | 79 |
| small group 2 | 80 | 81 | 82 | 83 | 84 | 85 | 86 | 87 |
| small group 3 | 88 | 89 | 90 | 91 | 92 | 93 | 94 | 95 |
| small group 1 | 96 | 97 | 98 | 99 | 100 | 101 | 102 | 103 |
| small group 2 | 104 | 105 | 106 | 107 | 108 | 109 | 110 | 111 |
| small group 3 | 112 | 113 | 114 | 115 | 116 | 117 | 118 | 119 |
| small group 1 | 120 | 121 | 122 | 123 | 124 | 125 | 126 | 127 |
| small group 2 | 128 | 129 | 130 | 131 | 132 | 133 | 134 | 135 |
| small group 3 | 136 | 137 | 138 | 139 | 140 | 141 | 142 | 143 |
| small group 1 | 144 | 145 | 146 | 147 | 148 | 149 | 150 | 151 |
| small group 2 | 152 | 153 | 154 | 155 | 156 | 157 | 158 | 159 |
| small group 3 | 160 | 161 | 162 | 163 | 164 | 165 | 166 | 167 |

METHOD AND APPARATUS FOR PCI CLASSIFIED SELF-CONFIGURATION

This application is a continuation of International Application No. PCT/CN2013/075587, filed on May 14, 2013, which claims priority to Chinese Patent Application No. 201210418321.4 entitled "Method and Apparatus for PCI Classified Self-configuration" and filed before the State Intellectual Property Office of the PRC on Oct. 26, 2012, both of which are hereby incorporated by reference in its entirety.

TECHNICAL FIELD

The disclosure relates to a cellular mobile communication system, and particularly to a method and an apparatus for PCI classified self-configuration.

BACKGROUND

In a wireless communication network, a Physical Cell ID (PCI) is a unique sequence that identifies cells in the physical layer, and the role of the PCI is scrambling synchronization channels, so that the terminal can obtain cell identity while detecting synchronization channels. Because of the one to one relationship between the PCI and the primary synchronization sequence (PSS) as well as the secondary synchronization sequence (SSS), according to the 3rd Generation Partnership Project (3GPP) agreement, a long term evolution (LTE) system has a total of 504 PCIs available. These 504 PCIs are identified by different PSSs and SSSs, respectively. The 504 PCIs have been divided into 168 groups represented by 168 SSSs, i.e., group identifications. Each group has three identities represented by three PSSs. The three identities of each group are generally allocated to different cells under control of the same base station.

In the fourth generation mobile communication system and the LTE-advanced system, in addition that the macro cells need to occupy a part of PCI resources, a part of PCI resources also needs to be allocated to femtocells, relay stations and microcells as well as other heterogeneous nodes. In the areas where base stations are deployed densely, PCI resources may be insufficient. The approach generally used to solve the problem of insufficient resources is multiplexing PCI so as to ensure that PCI can be configured for each base station, while multiplexing PCI also brings multiplexing interferences to the network, i.e., too densely configuring PCI will make two cells which multiplex PCI so close that it will cause interference.

Further, through the cross-correlation study of PCI code, it is found that the cross-correlation of SSSs which identify PCI is not perfect. In the case of poor network environment, PCI will be interfered by other PCI which is produced by SSS shifting, and the smaller the displacement is, the greater the interference is, and this also makes it difficult to properly identify the synchronization signal. Thus, for adjacent cells, it is necessary to configure PCIs which are identified by SSSs with larger displacement. In other words, the PCI resources with smaller displacement are tried to be allocated to the nodes with greater distance to avoid the interference caused by the undesirable code property.

SUMMARY

The embodiments of the present invention provide a method for PCI classified self-configuration. The method for PCI classified self-configuration includes:

according to a characteristic of PCI code, dividing all PCIs into $\Delta_L$ large groups in accordance with a step length $\Delta_L$, and then dividing resources of each of the large groups into $\Delta_S$ small groups in accordance with a step length $\Delta_S$, generating a PCI resource list, and identifying each PCI in the PCI resource list by three sections of address codes, wherein the three sections of address codes represent a large group number, a small group number and an intra-group number of PCI, respectively;

mapping the PCI resources one by one to new base stations in accordance with a classification such that each new station and heterogeneous nodes covered thereby correspond to a small group of PCI resources; and $\Delta_S$ adjacent new base stations form a base station cluster which corresponds to a large group of PCI resources; and allocating a first PCI in each small group of PCI resources to a new base station, and randomly allocating the remaining PCIs in the small group of PCI resources to the heterogeneous nodes which are covered by the new base station.

On the other hand, the embodiment of the invention provides an apparatus for PCI classified self-configuration. The apparatus for PCI classified self-configuration includes:

a PCI resource list generation unit configured to according to characteristic of PCI code, divide all PCIs into $\Delta_L$ large groups in accordance with a step length $\Delta_L$, and then divide resources of each of the large groups into $\Delta_S$ small groups in accordance with a step length $\Delta_S$, generate a PCI resource list, and identify each PCI in the PCI resource list by three sections of address codes, wherein the three sections of address codes represent a large group number, a small group number and an intra-group number of PCI, respectively;

a classified mapping unit configured to map the PCI resources one by one to new base stations in accordance with a classification that each new station and heterogeneous nodes covered thereby correspond to a small group of PCI resources; and $\Delta_S$ adjacent new base stations form a base station cluster which corresponds to a large group of PCI resources; and an intra-small group PCI allocation unit configured to allocate a first PCI in each small group of PCI resources to a new base station, and randomly allocate the remaining PCIs in the small group of PCI resources to the heterogeneous nodes which are covered by the new base station.

BRIEF DESCRIPTION OF DRAWINGS

In order to more clearly illustrate the technical solutions of the embodiments of the present invention or the prior art, the drawings to be used in the descriptions of the embodiments or the prior art are briefly introduced as follows. Obviously, the following drawings just illustrate some embodiments of the present invention, and a person skilled in the art can obtain other drawings from these drawings without paying a creative effort.

FIG. 1 is a flowchart of a PCI classified self-configuration method according to an embodiment of the present invention.

FIG. 5 is a schematic diagram of PCI resource list which is generated in accordance with the step length $\Delta_L=8$, $\Delta_S=3$ according to an application example of the present invention.

DESCRIPTION OF EMBODIMENTS

Figure 2:
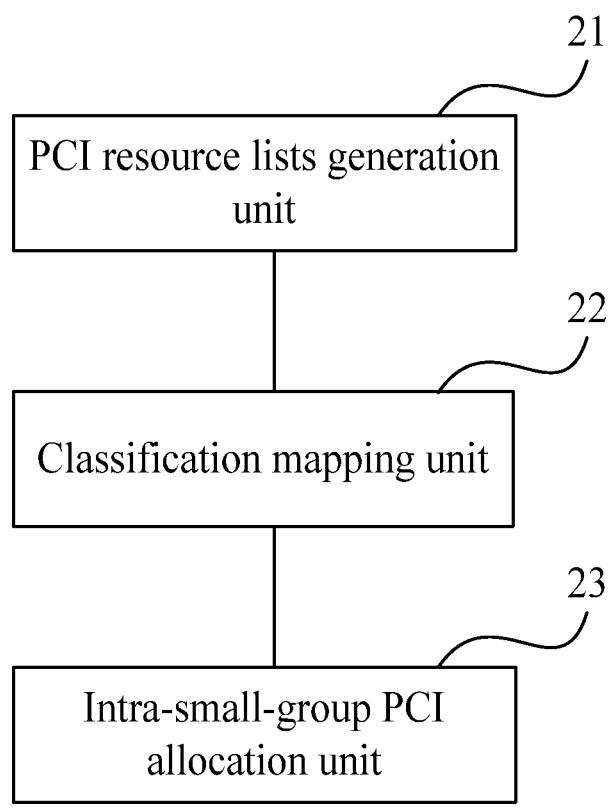
FIG. 2 is a structural schematic diagram of a PCI classified self-configuration apparatus according to an embodiment of the present invention.

However, during implementation of the embodiments of the present invention, the inventors find that at least the following problems exist in the prior art: the prior art urgently needs a scheme for PCI classified self-configuration to be able to effectively reduce the mutual interference among cells which use the same PCI and improve the performance of cell search for the user(s), especially for the user(s) in the edge of the cell, as well as shorten the configuration delay to ensure the timeliness of the configuration.

The technical solutions of the embodiments of the present invention will be clearly and completely described as follows with reference to the drawings in the embodiments of the present invention. Apparently, the described embodiments are just a part of embodiments of the present invention rather than all the embodiments. Based on the embodiments of the present invention, any other embodiment obtained by a person skilled in the art without paying a creative effort shall fall within the protection scope of the present invention.

The embodiments of the invention provide a method and an apparatus for PCI classified self-configuration to be able to effectively reduce the mutual interference among cells which use the same PCI and improve the performance of cell search for the user(s), especially for the user(s) in the edge of the cell, during, as well as shorten the configuration delay to ensure the timeliness of the configuration.

The embodiments of the present invention provide a method for PCI classified self-configuration. The method for PCI classified self-configuration includes:

according to a characteristic of PCI code, dividing all PCIs into $\Delta_L$ large groups in accordance with a step length $\Delta_L$, and then dividing resources of each of the large groups into $\Delta_S$ small groups in accordance with a step length $\Delta_S$, generating a PCI resource list, and identifying each PCI in the PCI resource list by three sections of address codes, wherein the three sections of address codes represent a large group number, a small group number and an intra-group number of PCI, respectively;

mapping the PCI resources one by one to new base stations in accordance with a classification such that each new station and heterogeneous nodes covered thereby correspond to a small group of PCI resources; and $\Delta_S$ adjacent new base stations form a base station cluster which corresponds to a large group of PCI resources; and allocating a first PCI in each small group of PCI resources to a new base station, and randomly allocating the remaining PCIs in the small group of PCI resources to the heterogeneous nodes which are covered by the new base station.

Optionally, in an embodiment of the invention, the step of according to the characteristic of PCI code, dividing all PCIs into $\Delta_L$ large groups in accordance with the step length $\Delta_L$, and then dividing resources of each of the large groups into the $\Delta_S$ small groups in accordance with the step length $\Delta_S$, and generating a PCI resource list comprises: when dividing all the PCIs into $\Delta_L$ large groups in accordance with the step length $\Delta_L$, allocating all the PCIs separated by the step length $\Delta_L$ to the same large group so as to form totally $\Delta_L$ large groups; when dividing all PCIs in each large group into $\Delta_S$ small groups in accordance with the step length $\Delta_S$, allocating all the PCIs separated by the step length $\Delta_S$ to the same small group, wherein two adjacent PCIs in the same small group of PCI resources are separated by a distance of $\Delta_L \times \Delta_S$; wherein the three sections of address codes are formed with three sections of binary codes which are separated by dots ".", wherein the first section of the address codes corresponds to the large group number of the PCI resource list; the second section of the address codes corresponds to a small group number in a certain large group of the PCI resource list; and the third section of the address codes corresponds to an intra-group number in a small group of PCI resources, to identify the location of any PCI in the small group of PCI resources.

Optionally, in an embodiment of the invention, when randomly allocating the remaining PCIs in the small group of PCI resources to the heterogeneous nodes which are covered by the new base station, where it is detected that the number of the heterogeneous nodes covered by the new base station exceeds the number of available PCIs in the small group of PCI resources, the PCI resources from other groups are multiplexed until all the heterogeneous nodes complete PCI configuration.

Optionally, in an embodiment of the invention, the multiplexing PCI resources from other groups until all the heterogeneous nodes complete PCI configuration, comprises: firstly, multiplexing PCI resources which have been used to configure heterogeneous nodes in the small group of a large group which number is the large group number of the new local base station plus 1; secondly, selecting PCI resources which have been used to configure the heterogeneous nodes in the small group of a large group which number is the large group number of the new local base station plus 2, and so on, until traversing all the large group numbers; if it is still not enough for use after traversing all the large group numbers, then letting the small group number plus 1 and re-traversing all the large group numbers, and so on, until all the heterogeneous nodes complete PCI configuration.

Optionally, in an embodiment of the invention, the allocating the first PCI in each small group of PCI resources to the new base station, and randomly allocating the remaining PCIs in the small group of PCI resources to the heterogeneous nodes which are covered by the new base station, comprises: after a new base station and heterogeneous nodes covered thereby completing PCI configuration, using the same configuration method to perform PCI configuration one by one for other new base stations and the heterogeneous nodes covered thereby until finally completing the PCI configuration of all the new base stations and the heterogeneous nodes covered thereby in the network, wherein the heterogeneous nodes include the following types: microcell, picocell, relay node and femtocell.

On the other hand, the embodiment of the invention provides an apparatus for PCI classified self-configuration. The apparatus for PCI classified self-configuration includes:

a PCI resource list generation unit configured to according to characteristic of PCI code, divide all PCIs into $\Delta_L$ large groups in accordance with a step length $\Delta_L$, and then divide resources of each of the large groups into $\Delta_S$ small groups in accordance with a step length $\Delta_S$, generate a PCI resource list, and identify each PCI in the PCI resource list by three sections of address codes, wherein the three sections of address codes represent a large group number, a small group number and an intra-group number of PCI, respectively;

a classified mapping unit configured to map the PCI resources one by one to new base stations in accordance with a classification that each new station and heterogeneous nodes covered thereby correspond to a small group of PCI resources; and $\Delta_S$ adjacent new base stations form a base station cluster which corresponds to a large group of PCI resources; and an intra-small group PCI allocation unit configured to allocate a first PCI in each small group of PCI resources to a new base station, and randomly allocate the remaining PCIs in the small group of PCI resources to the heterogeneous nodes which are covered by the new base station.

Optionally, in an embodiment of the invention, the PCI resource list generation unit is specifically configured to when dividing all the PCIs into $\Delta_L$ large groups in accordance with the step length $\Delta_L$, allocate all the PCIs separated by the step length $\Delta_L$ to the same large group so as to form totally $\Delta_L$ large groups; and when dividing all PCIs in each large group into $\Delta_S$ small groups in accordance with the step length $\Delta_S$, allocate all the PCIs separated by a step length $\Delta_S$ to the same small group, wherein two adjacent PCIs in the same small group of PCI resources are separated by a distance of $\Delta_L \times \Delta_S$; wherein the three sections of address codes are formed with three sections of binary codes which are separated by dots ".", wherein the first section of the address codes corresponds to the large group number of the PCI resource list; the second section of the address codes corresponds to a small group number in a certain large group of the PCI resource list; and the third section of the address codes corresponds to an intra-group number in a small group of PCI resources, to identify the location of any PCI in the small group of PCI resources.

Optionally, in an embodiment of the invention, the intra-small group PCI allocation unit is specifically configured to when randomly allocating the remaining PCIs in the small group of PCI resources to the heterogeneous nodes which are covered by the new base station, where it is detected that the number of the heterogeneous nodes covered by the new base station exceeds the number of available PCIs in the small group of PCI resources, multiplex the PCI resources from other groups until all the heterogeneous nodes complete PCI configuration.

Optionally, in an embodiment of the invention, the intra-small group PCI allocation unit is further configured to firstly multiplex PCI resources which have been used to configure heterogeneous nodes in the small group of a large group which number is the large group number of the new local base station plus 1; and secondly select PCI resources which have been used to configure the heterogeneous nodes in the small group of a large group which number is the large group number of the new local base station plus 2, and so on, until traversing all the large group numbers; if it is still not enough for use after traversing all the large group numbers, then letting the small group number plus 1 and re-traversing all the large group numbers, and so on, until all the heterogeneous nodes complete PCI configuration.

Optionally, in an embodiment of the invention, the intra-small group PCI allocation unit is specifically configured to after a new base station and heterogeneous nodes covered thereby completing PCI configuration, use the same configuration method to perform PCI configuration one by one for other new base stations and the heterogeneous nodes covered thereby until finally completing the PCI configuration of all the new base stations and the heterogeneous nodes covered thereby in the network, wherein the heterogeneous nodes include the following types: microcell, picocell, relay node and femtocell.

The above technical solutions have the following beneficial effects. By using the technical means that the classification is performed in accordance with the characteristic of PCI code and the classification of each PCI is represented by three sections of address codes in order to achieve fast PCI self-configuration for all new base stations and the heterogeneous nodes covered thereby in the network; and the above technical solutions serve as general configuration methods to provide solutions to automatic configuration of PCIs when adding a single network node, thus the following technical effects are achieved: the mutual interference among cells which use the same PCI can be effectively reduced and the performance of the users, especially the performance of the users in the edge of the cell, can be improved during cell search, and meanwhile the configuration delay can be shortened to ensure the timeliness of the configuration.

FIG. 1 shows a flowchart of a PCI classified self-configuration method according to an embodiment of the present invention. The PCI classified self-configuration method includes:

101: According to characteristic of PCI code, dividing all PCIs into $\Delta_L$ large groups in accordance with a step length $\Delta_L$, and then dividing resources of each of the large groups into $\Delta_S$ small groups in accordance with a step length $\Delta_S$ generating a PCI resource list, and identifying each PCI in the PCI resource list by three sections of address codes, wherein the three sections of address codes represent a large group number, a small group number and an intra-group number of PCI, respectively;

102: Mapping the PCI resources one by one to new base stations in accordance with a classification such that each new station and heterogeneous nodes covered thereby correspond to a small group of PCI resources; and $\Delta_S$ adjacent new base stations form a base station cluster which corresponds to a large group of PCI resources; and

103: Allocating a first PCI in each small group of PCI resources to a new base station, and randomly allocating the remaining PCIs in the small group of PCI resources to the heterogeneous nodes which are covered by the new base station.

Optionally, the step of according to the characteristic of PCI code, dividing all PCIs into $\Delta_L$ large groups in accordance with the step length $\Delta_L$ and then dividing resources of each of the large groups into $\Delta_S$ small groups in accordance with the step length $\Delta_S$, and generating a PCI resource list includes: when dividing all the PCIs into $\Delta_L$ large groups in accordance with the step length $\Delta_L$ allocating all the PCIs separated by a step length $\Delta_L$ to the same large group so as to form totally $\Delta_L$ large groups; and when dividing all PCIs in each large group into $\Delta_S$ small groups in accordance with a step length $\Delta_S$, allocating all the PCIs separated by a step length $\Delta_S$ to the same small group, wherein two adjacent PCIs in the same small group of PCI resources are separated by a distance of $\Delta_L \times \Delta_S$, wherein the three sections of address codes are formed with three sections of binary codes which are separated by dots ".", wherein the first section of the address codes corresponds to the large group number of the PCI resource list; the second section of the address codes corresponds to a small group number in a certain large group of the PCI resource list; and the third section of the address codes corresponds to an intra-group number in a small group of PCI resources to identify the location of any PCI in the small group of PCI resources.

Optionally, when randomly allocating the remaining PCIs in the small group of PCI resources to the heterogeneous nodes which are covered by the new base station, where it is detected that the number of heterogeneous nodes covered by the new base station exceeds the number of available PCIs in the small group of PCI resources, the PCI resources from other groups are multiplexed until all the heterogeneous nodes complete PCI configuration.

Optionally, the multiplexing PCI resources from other groups until all the heterogeneous nodes complete PCI configuration, includes: firstly, multiplexing PCI resources which have been used to configure heterogeneous nodes in the small group of a large group which number is the large group number of the new base station plus 1; secondly selecting PCI resources which have been used to configure heterogeneous nodes in the small group of a large group which number is the large group number of the new base station plus 2, and so on, until traversing all the large group numbers; if it is still not enough for use after traversing all the large group numbers, then letting the small group number plus 1 and re-traversing all the large group numbers, and so on, until all the heterogeneous nodes complete PCI configuration.

Optionally, the allocating a first PCI in each small group of PCI resources to a new base station, and randomly allocating the remaining PCIs in the small group of PCI resources to the heterogeneous nodes which are covered by the new base station, includes: after a new base station and heterogeneous nodes covered thereby completing PCI configuration, using the same configuration method to perform PCI configuration one by one for other new base stations and the heterogeneous nodes covered thereby until finally completing the PCI configuration of all the new base stations and the heterogeneous nodes covered thereby in the network, wherein the heterogeneous nodes include the following types: microcell, picocell, relay node and femtocell.

Corresponding to the above method embodiment, FIG. 2 shows a structural schematic diagram of a PCI classified self-configuration apparatus according to an embodiment of the present invention. The PCI classified self-configuration apparatus includes:

a PCI resource list generation unit 21 configured to according to characteristic of PCI code, divide all PCIs into $\Delta_L$ large groups in accordance with a step length $\Delta_L$, and then divide resources of each of the large groups into $\Delta_S$ small groups in accordance with a step length $\Delta_S$, generate a PCI resource list, and identify each PCI in the PCI resource list by three sections of address codes, wherein the three sections of address codes represent a large group number, a small group number and an intra-group number of PCI, respectively;

a classified mapping unit 22 configured to map the PCI resources one by one to new base stations in accordance with a classification such that each new station and heterogeneous nodes covered thereby correspond to a small group of PCI resources; and $\Delta_S$ adjacent new base stations form a base station cluster which corresponds to a large group of PCI resources; and an intra-small-group PCI allocation unit 23 configured to allocate a first PCI in each small group of PCI resources to a new base station, and randomly allocate the remaining PCIs in the small group of PCI resources to the heterogeneous nodes which are covered by the new base station.

Optionally, the PCI resource list generation unit 21 is specifically configured to when dividing all the PCIs into $\Delta_L$ large groups in accordance with the step length $\Delta_L$, allocate all the PCIs separated by the step length $\Delta_L$ to the same large group so as to form totally $\Delta_L$ large groups; and when dividing all PCIs in each large group into $\Delta_S$ small groups in accordance with the step length $\Delta_S$, allocate all the PCIs separated by a step length $\Delta_S$ to the same small group, wherein two adjacent PCIs in the same small group of PCI resources are separated by a distance of $\Delta_L \times \Delta_S$; wherein the three sections of address codes are formed with three sections of binary codes which are separated by dots ".", wherein the first section of the address codes corresponds to the large group number of the PCI resource list; the second section of the address codes corresponds to a small group number in a certain large group of the PCI resource list; and the third section of the address codes corresponds to an intra-group number in a small group of PCI resources, to identify the location of any PCI in the small group of PCI resources.

Optionally, the intra-small-group PCI allocation unit 23 is specifically configured to when randomly allocating the remaining PCIs in the small group of PCI resources to the heterogeneous nodes which are covered by the new base station, where it is detected that the number of the heterogeneous nodes covered by the new base station exceeds the number of available PCIs in the small group of PCI resources, multiplex the PCI resources from other groups until all the heterogeneous nodes complete PCI configuration.

Optionally, the intra-small-group PCI allocation unit 23 is further configured to firstly multiplex PCI resources which have been used to configure heterogeneous nodes in the small group of a large group which number is the large group number of the new base station plus 1; and secondly select PCI resources which have been used to configure the heterogeneous nodes in the small group of the large group number plus 2 in the new base station, and so on, until traversing all the large group numbers; if it is still not enough for use after traversing all the large group numbers, then letting the small group number plus 1 and re-traversing all the large group numbers, and so on, until all the heterogeneous nodes complete PCI configuration.

Optionally, the intra-small-group PCI allocation unit 23 is further configured to after a new base station and heterogeneous nodes covered thereby completing PCI configuration, use the same configuration method to perform PCI configuration one by one for other new base stations and the heterogeneous nodes covered thereby until finally completing the PCI configuration of all the new base stations and the heterogeneous nodes covered thereby in the network, wherein the heterogeneous nodes comprise the following types: microcell, picocell, relay node and femtocell.

The above method or apparatus technical solutions according to the embodiments of the invention have the following beneficial effects. By using the technical means that the classification is performed in accordance with the characteristic of PCI code and the classification of each PCI is represented by three sections of address codes in order to achieve fast PCI self-configuration for all new base stations and the heterogeneous nodes covered thereby in the network; and the above technical solutions serve as general configuration methods to provide solutions to automatic configuration of PCIs when adding a single network node, thus the following technical effects are achieved: the mutual interference among cells which use the same PCI can be effectively reduced and the performance of the users, especially the performance of the users in the edge of the cell, can be improved during cell search, and meanwhile the configuration delay can be shortened to ensure the timeliness of the configuration.

The following application examples are taken as examples for illustration.

Figure 3:
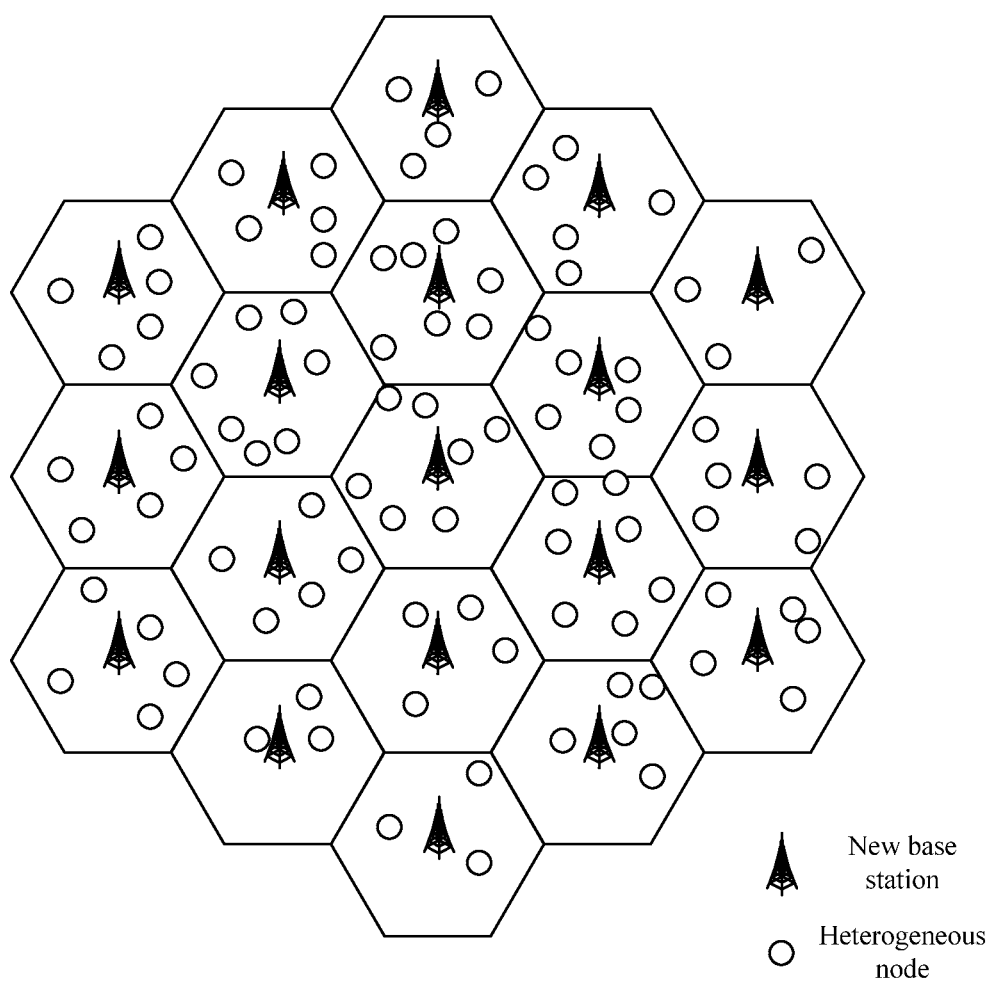
FIG. 3 is a schematic diagram of an application scenario of the PCI classified self-configuration method according to an application example of the present invention.

FIG. 3 shows a schematic diagram of an application scenario of the PCI classified self-configuration method according to an application example of the present invention. The application scenario is a common scenario of PCI allocation. Layout of a large number of new base stations is required in the entire area, and a certain number of heterogeneous nodes are deployed under each new base station. The types of the heterogeneous nodes include: microcell, picocell, relay and femtocel. These base stations have completed siting, infrastructure, communications equipment installation and powered up, and wait to complete self-configuration including the basic parameters and RF parameters of PCI configuration, then they can enter the running state. Before completion of the self-configuration, they cannot provide wireless access service for users. In this case, PCI self-configuration of network nodes is achieved by the network self-organizing technology, complex configuration work is no longer required to be done artificially. Moreover, the automated configuration method not only coordinates the interference caused by the use of PCI among the new base stations as well as among heterogeneous nodes, but also considers the mutual interference and influence between the new stations and heterogeneous nodes. In the actual scenario, the number of the new base stations is also not limited to 19 as shown in FIG. 3. Similarly, the number and the location that the heterogeneous nodes are deployed are also not limited as that shown in FIG. 3. In the actual network, the number of the heterogeneous nodes covered by a new base station may be very large, such as femtocel set for home and office, its deployment location is random and its number is huge. In this case, the present invention provides a general method for multiplexing PCI, which can minimize the interference arising from use of the same PCI in the network, and meanwhile ensure that the PCIs configured among the nodes which have a closer geographical location have a lower cross-correlation.

The objective of the application example according to the invention is to provide a PCI classified self-configuration method. The method performs classification according to the characteristic of the PCI code, and represents the classification of each PCI by three sections of address codes, in order to fast achieve automatic configuration of PCI for all new base stations and the heterogeneous nodes covered thereby in the network; and it also serves as a general configuration method to provide solutions for automatic configuration of PCI when a single network node is added.

In order to achieve the above objective of embodiments of the invention, the application examples of the invention provide a classified self-configuring method of PCI to classify and identify the PCI resource by a coding method which is similar to the IP address, so the network nodes can quickly and easily find an appropriate PCI and configure. The general allocation method applies to two scenarios: a scenario where that a large number of network nodes have been deployed in the initial deployment phase of the network, waiting for the configuration of PCI and other basic parameters; a scenario where that during the network operation phase, a single network node is added to the network. The classification of PCI resources is to allocate PCIs which have a high cross-correlation to different groups, according to the characteristics of PCI codes, in order to ensure the distance between adjacent PCIs is larger when configuring a new base station.

Figure 4:
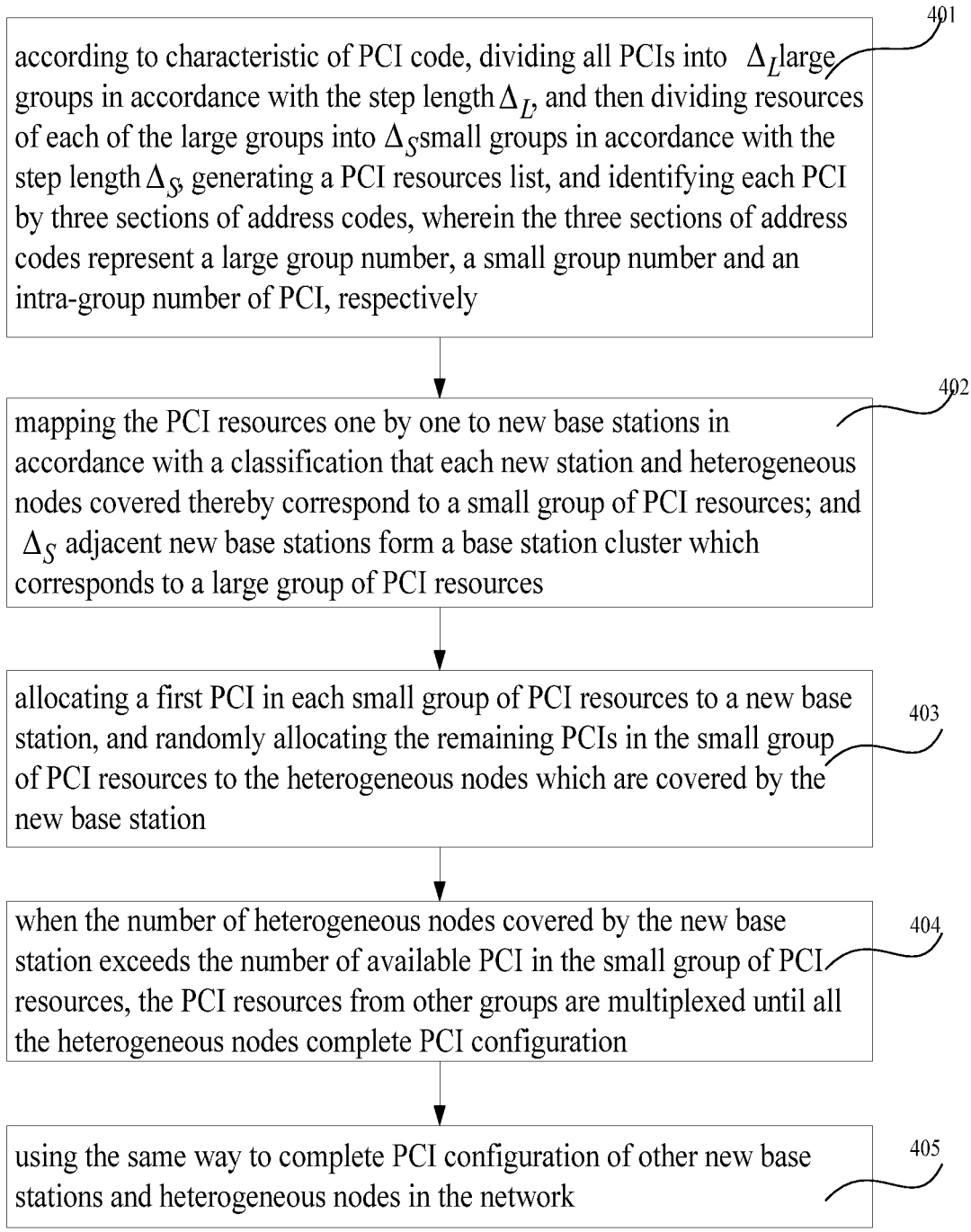
FIG. 4 is a diagram of operation steps of the PCI classified self-configuration method according to an application example of the present invention.

FIG. 4 shows a diagram of operation steps of the PCI classified self-configuration method according to an application example of the present invention, which includes:

401: According to the characteristic of PCI code, dividing all PCIs into $\Delta_L$ large groups in accordance with the step length $\Delta_L$, and then dividing resources of each of the large groups into $\Delta_S$ small groups in accordance with the step length $\Delta_S$, generating a PCI resource list, and identifying each PCI by three sections of address codes, wherein the three sections of address codes represent a large group number, a small group number and an intra-group number of PCI, respectively;

402: Mapping the PCI resources one by one to new base stations in accordance with a classification such that each new station and heterogeneous nodes covered thereby correspond to a small group of PCI resources; and $\Delta_S$ adjacent new base stations form a base station cluster which corresponds to a large group of PCI resources;

403: Allocating a first PCI in each small group of PCI resources to a new base station, and randomly allocating the remaining PCIs in the small group of PCI resources to the heterogeneous nodes which are covered by the new base station;

404: When the number of heterogeneous nodes covered by the new base station exceeds the number of available PCIs in the small group of PCI resources, multiplexing the PCI resources from other groups until all the heterogeneous nodes complete PCI configuration; and 405: Using the same way to complete PCI configuration of other new base stations and heterogeneous nodes in the network.

In the step 401, there are totally 168 groups of PCI resources. All the PCIs with separated step length $\Delta_L$ are allocated to the same large group so as to form totally $\Delta_L$ large groups, for example: when $\Delta_L=8$, PCIs which are 0, 8, 16, 24, 32, ..., 160 will be allocated to the same large group; then all PCIs in each large group are divided into $\Delta_S$ small groups in accordance with a step length $\Delta_S$. In this case, two adjacent PCIs in the same small group are spaced apart by a distance of $\Delta_L \times \Delta_S$, for example, PCIs which are 0, 24, 48, 72, 96, 120, 144 will be allocated to the same small group when $\Delta_L=8$ and $\Delta_S=3$.

In the step 401, the three sections of address codes have a coding method similar to network IP address, and are formed with three sections of binary codes which are separated by dots ".". In which, the first section of address codes corresponds to the large group number of the PCI resource list; the second sections of address codes corresponds to a small group number in a large group of the PCI resource list; the third sections of address codes corresponds to an intra-group number in a small group of PCI resources to identify the location of any PCI in the small group of PCI resources. For example, when PCI is in the third of the first small group of the fourth large group, the three sections of address codes are 011.000.010.

In the step 402, the judgment of the adjacent new base stations and the heterogeneous nodes covered thereby is determined in accordance with the basic configuration information which the new stations have acquired in the early stages of building a network. The information can be used to assist PCI self-configuration and provide necessary information support. The information includes geographical location information, the node type, neighborhood relations, the cell radius and so on which are obtained by satellite navigation system. The adjacent new base station refers to the new base stations which mutually exist in adjacent areas of the counter-party; coverage refers to whether the position of heterogeneous nodes is within the coverage area of the cell radius of the new base station.

In the step 402, the mapping of the PCI resources to the network node determines the relationship between the PCI resources classification and the new base station, i.e., a large group of PCI resources corresponds to a base station cluster; a small group of PCI resources in the same large group corresponds to the new base stations in the base station cluster, thereby determining a large group number and a small group number of each new base station.

In the step 403, the configuration method is executed after the large group number and the small group number being determined by a new base station. It is stipulated that the first PCI in a small group, i.e., PCI whose third section of address codes is 000 is allocated to the new base stations, the remaining PCIs in the small group are randomly allocated to other heterogeneous nodes. When the number of the heterogeneous nodes is less than the number of remaining PCI resources of the small group, excess PCIs will be given up and not be used. When the number of the heterogeneous nodes is more than the number of remaining PCI resources, the PCI resources from other groups need to be multiplexed.

In the step 404, the multiplexing principle is as follows: firstly multiplexing PCI resources which have been used to configure heterogeneous nodes in the small group of a large group which number is the large group number of the new base station plus 1. For example, if the first and second sections of address codes of the new base station are 001.000, then the PCI resources in the small group 010.000 except 010.000.000 are given priority to be selected to multiplex; secondly, the PCI resources which have been used to configure the heterogeneous nodes in the small group of a large group which number is the large group number of the new base station plus 2 are selected, and so on. If it is still not enough for use after traversing all the large group numbers, then let the small group number plus 1 and re-traversing all the large group numbers, and so on. For example, if the new base station 001.000 has traversed all the large groups, then PCI resources in the small group 001.001 except 001.001.000 are selected, and all the large group numbers are re-traversed.

In the step 405, PCI self-configuration is performed by taking a new base station and the heterogeneous nodes covered thereby as a cycle. After a new base station and the heterogeneous nodes covered thereby complete PCI configuration, the same configuration method is used to complete PCI configuration one by one for other new base stations and the heterogeneous nodes covered thereby until finally completing the PCI configuration of all the new base stations and all heterogeneous nodes covered by thereof in the network.

The new base station according to the application examples of the method of the invention refers to the macro base station in a long term evolution, LTE, system and the LTE-advanced system, LTE-A. The types of the heterogeneous nodes include microcell, picocell, relay node and femtocel.

In the PCI resource list which is generated in the application examples of the invention, all the PCI resources are divided into $\Delta_L$ large groups in accordance with the step length $\Delta_L$. This firstly ensures that all elements of each large group are far enough to ensure that all PCIs whose cross-correlation is high are divided into different large groups, that is, all PCIs of each large group keep low cross-correlation. Then, the PCIs of each large group are divided into $\Delta_S$ small groups by the step length $\Delta_S$, because the PCIs of each small group corresponds only to a new base station, it is ensured that the PCIs configured for the heterogeneous nodes covered by the new base station are separated far enough. PCI resource list classification can use combinations of other step length, such as $\Delta_L=6$, $\Delta_S=4$ or $\Delta_L=7$, $\Delta_S=4$, and so on. The choice of the step length can be determined according to different network topological structure, for example, when the number of new base stations is large in the network and the number of the heterogeneous nodes covered by each new base station is small, step length $\Delta_L=14$, $\Delta_S=4$ can be used, and its sufficient classification number can meet the needs of the new base station configuration, and meanwhile, each small group contains two PCIs for heterogeneous node configuration, which would not cause too much waste of resources.

The application scenarios of the application examples of the method of the invention is that a given number of the new base stations and the heterogeneous nodes covered thereby request to complete the configuration of PCI, and at the same time complete the configuration of PCI when a single network node is added to the network under the running state of the network. When the new base station is added, by the three sections of address codes of the PCIs of the surrounding neighborhood cell to the new base station, the first PCI unused in same large group as that of the surrounding neighborhood cell but different small group from that of the surrounding neighborhood cell is selected from a list of PCI resources to perform configuration. For the heterogeneous node which is newly added, by acquiring the three sections of address code of the PCI of the new base station by which the new heterogeneous node are covered, the PCI unused in same small group as that of the new base station is selected from a list of PCI resources to perform configuration.

The PCI self-configuration method is directed to a cellular mobile communication long term evolution, LTE, system and the LTE-advanced system, and the method is also applicable to scrambling code allocation in the CDMA system, the frequency allocation in the GSM system, and frequency channel allocation in WLAN.

FIG. 5 shows a schematic diagram of PCI resource list which is generated in accordance with the step length $\Delta_L=8$, $\Delta_S=3$ according to an application example of the present invention, which introduces the classification situation of the PCIs generated by the network self-organizing server according to an application example of the present invention, as follows:

There are 168 groups of PCIs, generated by shifting and superposition of SSS, and classified as PCIs numbering with 0-167 in the resources list in FIG. 5.

For example, the step length $\Delta_L=8$, $\Delta_S=3$ is taken as an example to classify the PCIs numbering with 0-167, to generate a resources list.

First, PCIs numbered as 0-167 are divided into 8 large groups in accordance with step length $\Delta_L=8$, i.e., each column in FIG. 5 is a large group, and each large group contains 21 PCIs whose numbers differ by 8. Then the PCIs in each large group are divided into 3 small groups in accordance with step length $\Delta_S=3$, and each small group contains 7 PCIs whose numbers differ by 24, e.g., the numbers of PCI are 0, 24, 48, 72, 96, 120, 144 in the first small group of the first large group. The large group number, small group number and intra-group number of all PCIs are identified according to three sections of address code. For example, the third PCI in the second small group of the third large group is numbered as 58, and its three sections of address code are 010.001.010.

Figure 6:
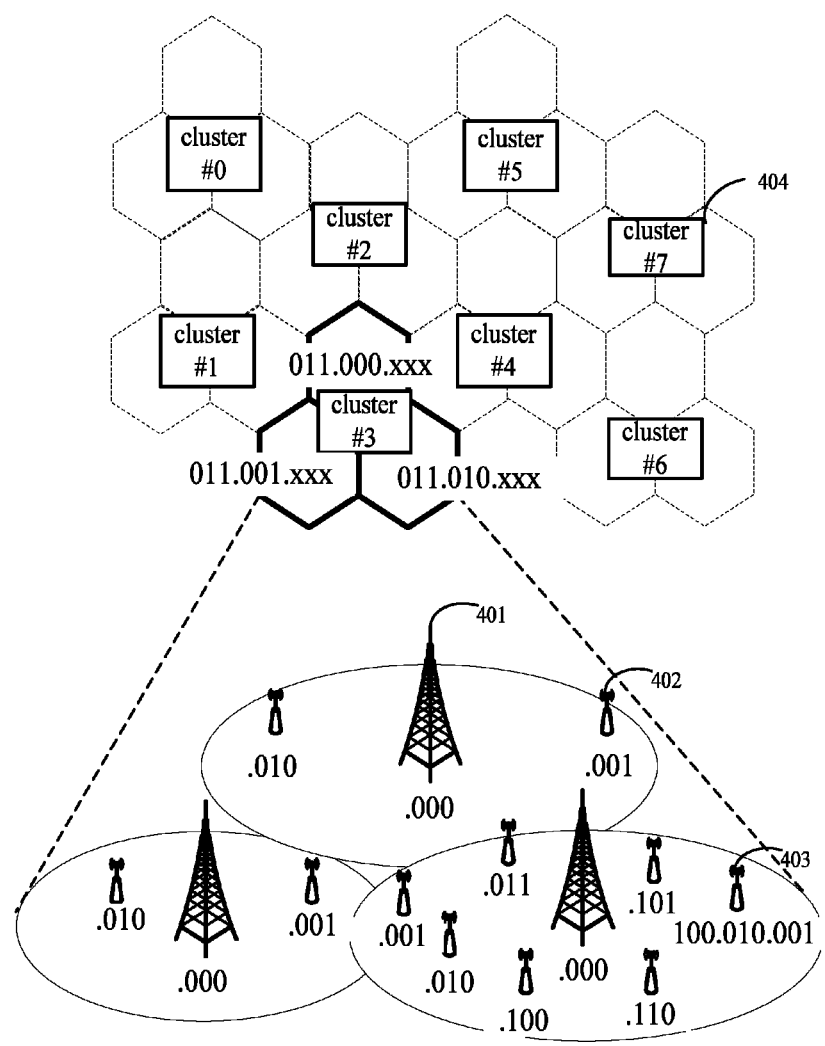
FIG. 6 is a mapping schematic diagram between PCI resources and network nodes according to an application example of the present invention.

FIG. 6 shows a mapping schematic diagram between PCI resource and network nodes according to an application example of the present invention, which specifically introduces the test situation of an embodiment of PCI self-configuration for a given number of new base stations and heterogeneous nodes according to an application example of the method of the present invention.

In the initial stage of network deployment, firstly PCI resource list is generated to be used in accordance with the method according to step 401, for example, the PCI resource list of $\Delta_L=8$, $\Delta_S=3$ as shown in FIG. 5 is used, and in the resources list, each small group contains a PCI for macro base station and 6 PCIs for heterogeneous nodes. Then, mapping between PCI resource list and network nodes is performed.

PCI allocation is performed by taking a new base station as a unit, and after the PCI configuration of a base station and the heterogeneous nodes covered thereby, PCI configuration of the next base station is executed.

The new base station determines its large group number and small group number according to the mapping relationship between the PCI resources and the network nodes, for example, the new base station is the first new base station whose PCI is not configured in the fourth base station cluster, then its large group number and small group number are 011.000, and the new base station and the heterogeneous nodes covered thereby will use PCI resources within the small group 011.000. Next, the first PCI in the small group is allocated to the new base station, i.e., the new base station uses three sections of address code 011.000.000 to configure, corresponding to the PCI numbering with 3 in the PCI resource list.

In case of the heterogeneous nodes covered by the new base station are no more than six, the large group number and the small group number which are the same as PCI address code of the new base station are uniformly configured, that is 011.000, a PCI is obtained by random allocation from the small group, as shown in FIG. 6 the heterogeneous nodes are randomly allocated to get three sections of address code of PCI, i.e., 011.000.001, corresponding to the PCI numbering with 27 in PCI resource list.

If the heterogeneous nodes covered by the new base station are more than six, then it is needed to multiplex PCI of other groups. The number of PCIs which needs to be multiplexed is determined according to the number of the heterogeneous nodes. For example, when the number of the heterogeneous nodes is 36, in addition to the local PCI small group, five PCI small group resources are still needed to meet configuration requirements. When PCI resources of other small groups are multiplexed, the large group number and the small group number of multiplexed PCI only needs to be determined, and the rule is as follows.

Firstly, the PCIs in the small group of a large group which number is the PCI large group number of the new base station plus 1 are multiplexed. For example, as shown in FIG. 6, the large group number 011 of the heterogeneous nodes is added with 1 and the small group number keeps unchanged, then the PCI for the heterogeneous node in the PCI small group 100.010 is selected, and thus the three sections of address code of PCI configured for the heterogeneous node is 100.010.001.

If the number of the heterogeneous nodes is too large in FIG. 6, PCIs of other small group need to be multiplexed, then PCI resources in large group which number is the large group number of the new base station plus 2 are multiplexed, and so on, until all the large groups are traversed. If it still cannot meet the requirements, then the small group number is added with 1 and all the large group numbers are re-traversed, and so on. For example, when the number of the heterogeneous nodes is increasing, for the heterogeneous nodes covered the new base station, the sequence of the first two sections of address code of the multiplexed PCI resources is 011.010, 100.010, 101.010, 110.010, 111.010, 000.010, 001.010, 010.010, 011.011, 100.011, 101.011, 110.011, 111.011, 000.011, 001.011, 010.011, 011.100, 100.100, 101.100, 110.100, 111.100, 000.100, 001.100, 010.100.

PCI configuration is performed for the new base station and the heterogeneous nodes covered thereby in the last base station cluster in the network. PCI configuration is carried out one by one by taking the base station as a unit, until configuration for the last new base station and the heterogeneous nodes covered thereby in the network is completed.

The application examples of the invention provide a method of PCI classified self-configuration for homogeneous and heterogeneous scenarios in the cellular mobile communication network. According to the physical characteristics of the PCI, the PCIs are classified in accordance with different step lengths and the PCI resource list is generated. After classification, each PCI is identified by three sections of address code. According to the location deployment of the base station and neighborhood relations, a network node quickly searches for a suitable PCI from the PCI resource list to perform configuration through the PCI address code used by neighborhood. The application examples of the invention are also applicable to PCI self-configuration when the new base station or the heterogeneous nodes are added under the running state of the network, and PCIs whose cross-correlation is high are divided into different groups, to avoid the interference due to cross-correlation of PCIs where network environment is not ideal. The classified self-configuration method takes into account the complexity and performance, and facilitates quick and efficient configuration of PCIs. The beneficial results of the embodiment of the present invention are: the application examples of the invention can not only effectively reduce the mutual interference among cells which use the same PCI and improve the performance of the users, especially the performance of the users in the edge of the cell, during cell search, but also can shorten the configuration delay to ensure the timeliness of the configuration. The application examples of the invention provide a general method of PCI classified self-configuration for homogeneous and heterogeneous scenarios in the cellular mobile communication system. Its steps are easy, and its computational complexity is low, and thus the method has good application prospects.

Persons skilled in the art may further understand that various illustrative logical blocks (illustrative logic block), units, and steps listed in the embodiments of the present invention may be implemented by using electronic hardware, computer software, or a combination of the two. To clearly describe interchangeability of hardware and software, functions of the foregoing illustrative components (illustrative components), units, and steps have been generally described. Whether such functions are implemented by using hardware or software depends on a particular application and a design requirement of the entire system. Persons skilled in the art may use various manners to implement the functions for each particular application, but it should not be considered that such implementation goes beyond the protection scope of the embodiments of the present invention.

The various illustrative logical blocks or units described in the embodiments of the present invention may implement or operate the described functions through a design of a general processor, a digital signal processor, an application-specific integrated circuit (ASIC), a field programmable gate array (FPGA) or another programmable logical apparatus, a discrete gate or transistor logic, a discrete hardware component, or any combination of the foregoing. The general processor may be a micro processor. Optionally, the general processor may also be any traditional processor, controller, micro controller, or state machine. The processor may also be implemented by using a computing apparatus combination, such as a digital signal processor and a micro processor, multiple micro processors, one or more micro processors with a digital signal processor core, or any other similar configuration.

Steps of the method or algorithm described in the embodiments of the present invention may be directly embedded into hardware, a software module executed by a processor, or a combination of the two. The software module may be stored in a RAM memory, a flash memory, a ROM memory, an EPROM memory, an EEPROM memory, a register, a hard disk, a movable disk, a CD-ROM, or a storage medium of any other form in the art. Exemplarily, the storage medium may connect to the processor so that the processor may read information from the storage medium and write information into the storage medium. Optionally, the storage medium may also be integrated into the processor. The processor and the storage medium may be disposed in the ASIC and the ASIC may be disposed in a user terminal. Optionally, the processor and the storage medium may also be disposed in different components of the user terminal.

In one or more exemplary designs, the foregoing functions described in the embodiments of the present invention may be implemented by using hardware, software, firmware, or any combination of the three. If the foregoing functions are implemented by the software, these functions may be stored on a computer-readable medium or are transmitted to a computer-readable medium in the form of one or more instructions or codes. The computer-readable medium includes a computer storage medium and a communication medium that enables a computer program to move from one place to another place. The storage medium may be an available medium that may be accessed by any general or special computer. For example, such computer-readable medium may include but is not limited to a RAM, a ROM, an EEPROM, a CD-ROM or another optical disk storage, a magnetic disk storage or another magnetic storage apparatus, or any other medium that may be used to bear or store a program code, where the program code is in the form of an instruction or data structure or the form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, and such software is also included in the defined computer-readable medium. The disk (disk) and disc (disc) include a compressed magnetic disc, a laser disk, an optical disk, a DVD, a floppy disk, and a blue-ray disk. The disc generally copies data through magnetic and the disk generally copies data optically through laser. The foregoing combination may also be included in the computer-readable medium.

The objectives, technical solutions, and beneficial effects of the present invention have been described in further detail through the above specific embodiments. It should be understood that the above descriptions are merely specific embodiments of the present invention, but not intended to limit the protection scope of the present invention. Any modification, equivalent replacement, improvement, etc. made within the spirit and principles of the present invention shall fall within the protection scope of the present invention.

What is claimed is:

1. A method of physical cell ID (PCI) classified self-configuration, comprising:
    accumulating a plurality of PCIs; dividing all PCIs into $\Delta_L$ large groups in accordance with a step length $\Delta_L$;
    and then dividing resources of each of the large groups into $\Delta_S$ small groups in accordance with a step length $\Delta_S$, according to characteristic of PCI code;
    generating a PCI resource list,
        wherein the steps of dividing all PCIs in the PCI resource list into $\Delta_L$ large groups in accordance with the step length $\Delta_L$, dividing resources of each of the large groups into $\Delta_S$ small groups in accordance with the step length $\Delta_S$, and generating a PCI resource list comprises:
    allocating all PCIs separated by the step length $\Delta_L$ to the same large group when dividing all PCIs into $\Delta_L$ large groups in accordance with the step length $\Delta_L$ to form totally $\Delta_L$ large groups; and
    allocating all PCIs separated by the step length $\Delta_S$ to the same small group when dividing all PCIs in each large group into $\Delta_S$ small groups in accordance with the step length $\Delta_S$,
        wherein two adjacent PCIs in the same small group of PCI resources are separated by a distance of $\Delta_L \times \Delta_S$,
        wherein the three sections of address codes are formed with three sections of binary codes that are separated by dots,
        wherein the first section of the address codes corresponds to the large group number of the PCI resource list,
        wherein the second section of the address codes corresponds to a small group number in a certain large group of the PCI resource list,
        wherein the third section of the address codes corresponds to an intra-group number in a small group of PCI resources, and
        wherein the three sections of the address codes together identify the location of any PCI in the small group of PCI resources;
    identifying each PCI in the PCI resource list by three sections of address codes, wherein the three sections of address codes represent a large group number, a small group number and an intra-group number of PCI, respectively;
    mapping the PCI resources one by one to new base stations in accordance with a classification such that each new base station and heterogeneous nodes covered thereby correspond to a small group of PCI resources;
    forming a base station cluster from $\Delta_S$ adjacent new base stations, wherein the base station cluster corresponds to a large group of PCI resources; and
    allocating a first PCI in each small group of PCI resources to a new base station, and randomly allocating the remaining PCIs in the small group of PCI resources to the heterogeneous nodes which are covered by the new base station.

2. The method of PCI classified self-configuration according to claim 1, wherein, when randomly allocating the remaining PCIs in the small group of PCI resources to the heterogeneous nodes which are covered by the new base station, if it is detected that the number of the heterogeneous nodes covered by the new base station exceeds the number of available PCIs in the small group of PCI resources, then multiplexing the PCI resources from other groups until all the heterogeneous nodes complete PCI configuration.

3. The method of PCI classified self-configuration according to claim 2, wherein the multiplexing PCI resources from other groups until all the heterogeneous nodes complete PCI configuration comprises:

first, multiplexing PCI resources which have been used to configure heterogeneous nodes in the small group of a large group number of which is the large group number of the new base station plus 1;

second, multiplexing PCI resources which have been used to configure the heterogeneous nodes in the small group of a large group of which number is the large group number of the new base station plus 2;

repeating the multiplexing until all the large group numbers are traversed, optionally, if there is heterogeneous node that does not complete PCI configuration after all the large group numbers are traversed, multiplexing PCI resources by selecting the small group number plus 1 and re-traversing all the large group numbers; and repeating the optional multiplexing of small group numbers until all the heterogeneous nodes complete PCI configuration.

4. The method of PCI classified self-configuration according to claim 1, wherein allocating the first PCI in each small group of PCI resources to the new base station, and randomly allocating the remaining PCIs in the small group of PCI resources to the heterogeneous nodes which are covered by the new base station, comprises:

after a new base station and heterogeneous nodes covered thereby complete PCI configuration, using the configuration method of claim 1 to perform PCI configuration one by one for other new base stations and the heterogeneous nodes covered thereby until the PCI configuration of all the new base stations and the heterogeneous nodes covered thereby in the network is completed, wherein the heterogeneous nodes comprise the following types: microcell, picocell, relay node and femtocell.

5. An apparatus for physical cell ID (PCI) classified self-configuration, comprising:

a PCI resource list generation unit configured to divide all PCIs into large $\Delta_L$ groups in accordance with a step length $\Delta_L$, and then divide resources of each of the large groups into $\Delta_S$ small groups in accordance with a step length $\Delta_S$ according to characteristic of PCI code, generate a PCI resource list, and identify each PCI in the PCI resource list by three sections of address codes, wherein the three sections of address codes represent a large group number, a small group number and an intra-group number of PCI, respectively, and wherein the PCI resource list generation unit is configured to perform the divide, divide, generate and identify steps by:

allocating all PCIs separated by the step length $\Delta_L$ to the same large group to form totally $\Delta_L$ large groups when dividing all PCIs into $\Delta_L$ large groups in accordance with the step length $\Delta_L$; and allocating all PCIs separated by a step length $\Delta_S$ to the same small group when dividing all PCIs in each large group into $\Delta_S$ small groups in accordance with the step length $\Delta_S$, wherein two adjacent PCIs in the same small group of PCI resources are separated by a distance of $\Delta_L \times \Delta_S$, wherein the three sections of address codes are formed with three sections of binary codes that are separated by dots, wherein the first section of the address codes corresponds to the large group number of the PCI resource list, wherein the second section of the address codes corresponds to a small group number in a certain large group of the PCI resource list, wherein the third section of the address codes corresponds to an intra-group number in a small group of PCI resources, and wherein the three sections of the address codes identify the location of any PCI in the small group of PCI resources;

a classified mapping unit configured to map the PCI resources one by one to new base stations in accordance with a classification that each new station and heterogeneous nodes covered thereby correspond to a small group of PCI resources, wherein $\Delta_S$ adjacent new base stations form a base station cluster corresponding to a large group of PCI resources; and an intra-small-group PCI allocation unit configured to allocate a first PCI in each small group of PCI resources to a new base station, and randomly allocate the remaining PCIs in the small group of PCI resources to the heterogeneous nodes which are covered by the new base station.

6. The apparatus for PCI classified self-configuration according to claim 5, wherein the intra-small group PCI allocation unit is configured to, when randomly allocating the remaining PCIs in the small group of PCI resources to the heterogeneous nodes which are covered by the new base station, detect if the number of the heterogeneous nodes covered by the new base station exceeds the number of available PCIs in the small group of PCI resources, and, if so, then multiplex the PCI resources from other groups until all the heterogeneous nodes complete PCI configuration.

7. The apparatus for PCI classified self-configuration according to claim 6, wherein the intra-small-group PCI allocation unit is further configured to:

first multiplex PCI resources which have been used to configure heterogeneous nodes in the small group of a large group number of which is the large group number of the new base station plus 1; and second multiplex PCI resources which have been used to configure the heterogeneous nodes in the small group of a large group number of which is the large group number of the new base station plus 2;

repeat the multiplex step until all the large group numbers are traversed;

optionally, if there is heterogeneous node that does not complete PCI configuration after all the large group numbers are traversed, multiplex PCI resources by selecting the small group number plus 1, and re-traversing all the large group numbers; and repeating the optional multiplexing of small group numbers until all the heterogeneous nodes complete PCI configuration.

8. The apparatus for PCI classified self-configuration according to claim 5, wherein, after a new base station and heterogeneous nodes covered thereby completing PCI configuration, the intra-small group PCI allocation unit is configured to use the configuration method of claim 6 to perform PCI configuration one by one for other new base stations and the heterogeneous nodes covered thereby until the PCI configuration of all the new base stations and the heterogeneous nodes covered thereby in the network is completed, wherein the heterogeneous nodes comprise the following types: microcell, picocell, relay node and femtocell.

* * * * *